United States Patent [19]

O'Brien et al.

[11] Patent Number: 5,188,713
[45] Date of Patent: Feb. 23, 1993

[54] PROCESS FOR RECOVERY OF METAL

[75] Inventors: Robert N. O'Brien; Thomas D. McEwan, both of Victoria, Canada

[73] Assignee: Envirochip Technologies Ltd., Victoria, Canada

[21] Appl. No.: 665,016

[22] Filed: Mar. 5, 1991

[51] Int. Cl.$^5$ ............................................. C25C 1/12
[52] U.S. Cl. ................................. 204/106; 204/108; 423/32; 423/33; 423/36; 423/47; 423/87; 423/101; 423/143; 423/145; 423/578 A
[58] Field of Search ................... 204/106, 108; 423/32-33, 36, 47, 87, 101, 143, 145, 578 A

[56] References Cited

U.S. PATENT DOCUMENTS

| | | | |
|---|---|---|---|
| 3,888,748 | 6/1975 | Brennecke | 423/27 |
| 3,910,636 | 10/1975 | Hard | 423/27 |
| 3,912,330 | 10/1975 | Carnahan et al. | 423/34 |
| 4,067,953 | 1/1978 | Roux et al. | 423/69 |
| 4,084,961 | 4/1978 | Caldon | 75/101 R |
| 4,115,221 | 9/1978 | Wadsworth et al. | 204/108 |
| 4,116,488 | 9/1978 | Hsueh et al. | 299/4 |
| 4,189,461 | 2/1980 | Lueders et al. | 423/27 |
| 4,338,168 | 7/1982 | Stanley et al. | 204/108 |
| 4,878,945 | 11/1989 | Raudsepp et al. | 75/118 R |

OTHER PUBLICATIONS

Chemical Abstracts 79(14):82091y-Prater et al.-American Chemical Society 1990-"Nitric Acid Route to Processing Copper Concentrates".

*Primary Examiner*—John Niebling
*Assistant Examiner*—David G. Ryser
*Attorney, Agent, or Firm*—Baker & Daniels

[57] ABSTRACT

A process for recovery of metal from a feedstock comprising copper is provided. The process comprises the steps of:

(a) contacting the feedstock with an aqueous mixture comprising ammonium nitrate having a concentration greater than about 1.5M and sulphuric acid having a concentration greater than about 6M at a temperature of from about 105° C. to about 130° C., to produce a first residue comprising a cuprous salt and a leachate comprising copper;
(b) separating the residue from the leachate; and
(c) electrowinning copper from the leachate.

The process may also be used advantageously to recover iron present in the feedstock in a form other than jarosite.

22 Claims, 1 Drawing Sheet

PROCESS FOR RECOVERY OF METAL

FIELD OF THE INVENTION

The present invention relates to a novel process for recovery of metal from a feedstock comprising copper, and, optionally, at least one metal selected from the group consisting essentially of iron, zinc, silver and gold. More particularly, the present invention relates to a novel process for recovery of a metal from a sulphide or an arsenide comprising at least one of copper, iron, zinc, and silver, and from a telluride comprising at least one of copper, silver, gold and iron.

BACKGROUND OF THE INVENTION

The use of acidic leach media to leach sulphur, arsenic and telluride compounds of metals such as copper, iron, zinc, etc. is known. To date, much of the prior art has been devoted to the use of leach media comprising nitric acid and sulphuric acid at temperatures generally below 100° C. Unfortunately, when such leach media are utilized under these conditions, a solution containing 100% of the metal can not be obtained.

U.S. Pat. No. 3,888,748 (Brennecke) discloses a process for recovering metal values from ore concentrates. Essentially, the process comprises contacting the ore concentrate with an aqueous solution of nitric and sulphuric acids to produce a mixture comprising a residue and a leachate. The leachate is further processed to recover copper and iron precipitated as jarosite. This process is deficient in that it requires the use of highly corrosive acids as the leach medium. Moreover, the solution of nitric and sulphur acids does not completely dissolve the concentrate.

U.S. Pat. No. 3,910,636 (Hard) discloses a process for in-situ mining. Specifically, the process comprises the use of an acidic leaching medium comprising nitrate ions and having a pH of from about 0.2 to about 2.0. The process comprises drilling at least one well into an underground formation or ore deposit and thereafter sealing at least a portion of the well. The leaching solution is then introduced into the wellbore and thereafter into the zone in the formation immediately surrounding the wellbore. Since the process involves in-situ mining, a relatively dilute concentration of nitrate ion and sulphuric acid is required. Not surprisingly, the dilute nature of the leaching medium necessitates relatively long residence time to obtain maximum copper loading in the leach medium. Even with such long residence time, the leaching medium does not completely dissolve the contacted copper ore.

U.S. Pat. No. 3,912,330 (Carnahan et al) discloses chemical mining of copper porphyry ores. Specifically, it is disclosed that the addition of catalytic amounts of nitrate ion added to an oxygenated sulphuric acid leach medium purportedly improves the rate of copper extraction from copper sulphides contained in porphyry ores. It is disclosed that the nitrate ion has the catalytic effect when present in concentrations of from 0.05 to 0.50% of the leach medium. During the process, any codissolved iron is precipitated as jarosite. Thus, the pregnant leach solution recovered in the process purportedly comprises very low iron concentration. "Oxygen pressure" is disclosed as being an important variable in the process. Preferred oxygen pressures are in the range 25 psi-200 psi. The preferred temperature in the leaching step is 100° C. It is noteworthy that the patentee acknowledges that the subject process is not feasible for use in conventional surface heap leaching.

Indeed, the limitations of temperature and oxygen overpressure in conventional in-situ mining processes effectively exclude such processes from use in surface heap leaching applications.

It would be desirable to have a process for recovery of metal from a feedstock comprising copper and, optionally, at least one metal selected from the group consisting essentially of copper, iron, zinc, silver and gold. In cases where the feedstock comprises copper and iron, it would be desirable if the recovered iron was in a form other than jarosite which is a product of little or no value. It would also be desirable if such a process, when used in a batch-wise manner, was time efficient (e.g. minutes instead of hours).

SUMMARY OF THE INVENTION

It is an object of the present invention to provide a novel process for recovery of metal from a feedstock comprising copper and at least one metal selected from the group consisting essentially of iron, zinc, silver and gold.

It is another object of the present invention to provide a novel process which mitigates or obviates at least one of the above-mentioned deficiencies of the prior art.

Accordingly, the present invention provides a process for recovery of metal from a feedstock comprising copper and at least one metal selected from the group consisting essentially of iron, zinc, silver and gold, the process comprising the steps of:

(a) contacting the feedstock with an aqueous mixture comprising ammonium nitrate having a concentration greater than about 1.5M and sulphuric acid having a concentration greater than about 6M at a temperature of from about 105° C. to about 130° C., to produce a cuprous salt and a leachate comprising copper;

(b) separating the residue from the leachate; and (c) electrowinning copper from the leachate.

A key aspect of the present process is the temperature at which Step (a), the leaching step, is conducted. Specifically, it has been discovered that, in the leaching step, if a temperature is utilized at which rhombic sulphur is converted to monoclinic sulphur in the liquid phase, virtually complete dissolution will occur of the sulphide ores of the metals in the feedstock. Thus, the temperature the leaching step is in the range of from about 105° C. to about 130° C., preferably from about 110° C. to about 120° C., most preferably from about 112° C. to about 115° C.

Under such conditions the leaching step is very time efficient. Preferably, this step in the process is conducted in a period of time in the range of from about 10 to about 40 minutes, more preferably from about 15 to about 25 minutes, most preferably about 20 minutes.

BRIEF DESCRIPTION OF THE DRAWING

Embodiments of the present invention will be described with reference to the accompanying drawing which illustrates a schematic of the present process.

DETAILED DESCRIPTION OF THE PREFERRED EMBODIMENTS

Figure 1:
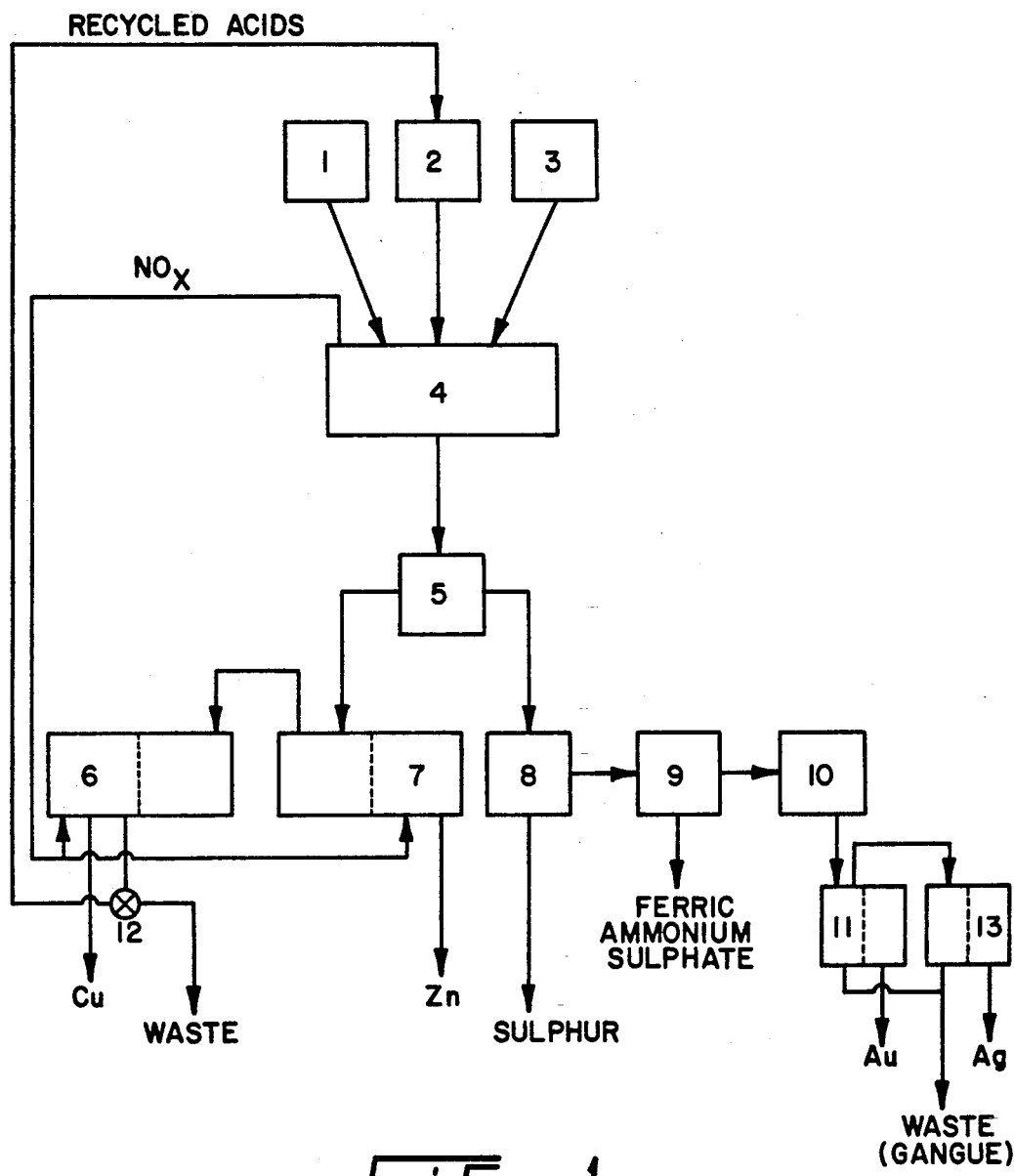

The feedstock suitable for use in the present process is not particularly restricted provided that it comprises copper (elemental or ionic form). Whether the feedstock additionally comprises at least one metal selected from the group consisting essentially of iron, zinc, silver and gold depends on the exact nature of the feedstock. Preferably, the feedstock is selected from at least one of an ore, a concentrate or a combination thereof. Non-limiting examples of suitable concentrates include chalcopyrite (comprises copper and iron), chalcocite (comprises copper), bornite (comprises copper and iron), molybdite, pyrite, arsenopyrite, sphalerite and tetrahedrite. Preferably, the concentrate is chalcopyrite. Alternatively, the ore may be a feedstock selected from sulphide or and arsenide ore. Non-limiting examples of suitable arsenide ores include iron diarsenide and cobalt diarsenide. Non-limiting examples of suitable sulphide ores are those comprising at least one member selected from the group consisting essentially of chalcopyrite, chalcocite, bornite, molybdite, pyrite, arsenopyrite, sphalerite and tetrahedrite. Further the feedstock may be a telluride precious metal ore also containing the uncombined metals (e.g. silver and gold).

It will be appreciated that, in certain cases, the feedstock may comprise both copper and iron. For example, in the case of sulphide ores containing minerals such as chalcopyrite ($CuFeS_2$) and bornite ($Cu_3FeS_4$), a preferred aspect of the present process may be used to recover both the copper and the iron as useful products. Additionally, aspects of the present process may be utilized to separate and recover other metals which may be in the feedstock, such as zinc, silver and gold.

The feedstock suitable for use in the present process is typically in particulate form. Preferably, the feedstock is ground to a size of from about 250 mesh to about 350 mesh, more preferably from about 275 mesh to about 325 mesh, prior to contact with the aqueous mixture in the first step of the present process.

In the initial step (i.e. Step (a)) of the present process, the feedstock is contacted with an aqueous mixture comprising ammonium nitrate having a concentration greater than about 1.5M, preferably in the range of from about 2.5 to about 4M, and sulphuric acid having a concentration greater than about 6M, preferably in the range of from about 7 to about 10M. The reaction between this aqueous mixture and the feedstock results in the production of a first residue comprising, inter alia, a cuprous salt and compounds of other metals (e.g. iron, silver and gold), if any, in the feedstock, and a leachate comprising copper (and zinc, if originally present in the feedstock) in solution. Step (a) is conducted at a temperature the range of from about 105° C. to about 130° C., preferably from about 110° C. to about 120° C., most preferably from about 112° C. to about 115° C.

The relatively high concentration of sulphuric acid used in Step (a) may be maintained by controlled oxidation of the sulphur to sulphate as required. The milk of sulphur precipitated in Step (a) is reduced accordingly. The relatively high concentration of ammonium nitrate used in Step (a) is believed to stabilized the cuprous salt as cuprous diamine sulphate which is insoluble in high concentrations of ammonium ion and sulphate ion.

In Step (b) of the present process, the first residue comprising cuprous salt and any iron, silver and gold originally present in the feedstock is separated from the leachate comprising dissolved copper and zinc (if originally present in the feedstock). The manner by which this separation is accomplished is not particularly restricted. In one embodiment, the first residue can be "blown down" at convenient intervals if Step (a) of the present process is operated in a continuous mode. Alternatively, the first residue may be washed out of the leach tank.

The separated leachate may then be subjected to conventional electrolytic techniques whereby copper in the leachate may be electrowon (Step (c)). If the leachate contains both dissolved copper and zinc, these metals may be electrowon preferentially on the basis of their unique electrode potentials. The electrode potential ($E^0$) for various metals is as follows:

| Reaction | Electrode Potential (V, at 25°) |
|---|---|
| $Zn^{2+} + 2e \rightleftharpoons Zn(s)$ | −0.763 |
| $Fe^{2+} + 2e \rightleftharpoons Fe(s)$ | −0.440 |
| $Cu^{2+} + 2e \rightleftharpoons Cu(s)$ | +0.337 |
| $Ag^+ + e \rightleftharpoons Ag(s)$ | +0.799 |
| $Au^+ + e \rightleftharpoons Au(s)$ | +1.68 |

Alternatively, copper may be recovered from the separated leachate by conventional cementation techniques involving the use of zinc or iron powder, as preferred.

In a preferred aspect of the present process, the first residue, after being separated from Step (b), is subjected to further treatment to recover copper from the cuprous ion in the residue. Preferably, this further treatment comprises the steps of:

(i) liquefying the first residue whereby sulphur is vaporized and a second residue results consisting essentially of the cuprous salt;

(ii) dissolving the cuprous salt in a suitable solvent;

(iii) disproportionating the cuprous salt to produce soluble cupric ion and metallic copper;

(iv) separating the soluble cupric ion from the metallic copper; and (v) recovering the soluble cupric ion as a cupric salt.

The manner by which the first residue is liquefied is not particularly restricted. For example, the first residue may be heated to a temperature of from about 200° to about 250° C. whereby liquid sulphur having a considerable vapour pressure is produced. The sulphur vapour may then be drawn off and condensed on a cold catchment and thereafter collected for burning or sale. This results in the second residue consists essentially of at least one cupric salt.

The second residue may be dissolved in a suitable solvent. Suitable solvents useful for this purpose are typically organic amines. Non-limiting examples of useful organic amines include acetonitrile, 2-hydroxycyanoethane, acrylonitrile and propionitrile. The preferred solvent is acetonitrile. The resultant solution may then be transferred to a separate vessel and made to disproportionate by agitation. The products of this disproportionation are copper metal powder and soluble cupric ion. After removal of the copper powder, the remaining solution may be vacuum evaporated and the acetonitrile recycled in a closed system. The soluble cupric ion may be recovered as the corresponding salt, for example, cupric sulphate and cupric amine sulphate by conventional electrowinning processes.

In cases where metal is being recovered from a feedstock comprising copper and iron, the first residue produced in Step (a) will comprise both a cuprous salt and a ferric salt. It is believed that the ferric salt is produced and precipitated as a result of the nature and concentration of the aqueous mixture utilized in Step (a). After this first residue is separated and recovered in Step (b), it may be further treated according to a preferred aspect of the present process to recover separately copper and ferric salt. Preferably, this further treatment comprises the steps of:

(i) liquefying the first residue whereby sulphur is vaporized and a second residue results consisting essentially of the cuprous salt and the ferric salt;

(ii) extracting said ferric salt with a suitable solvent;

(iii) dissolving the cuprous salt in a suitable solvent;

(iv) disporportionating the cuprous salt to produce soluble cupric ion and metallic copper;

(iv) separating the soluble cupric ion from the metallic copper; and (v) recovering the soluble cupric ion as a cupric salt. Typically, the ferric salt, namely ferric ammonium sulphate ($Fe(NH_4)_2(SO_4)_2$), is extracted with hot water. In this aspect of the present process the formation of jarosite (generally $MFe_3(SO_4)_2(OH)_5$ wherein M is a cation selected from sodium, potassium and ammonium ions) is substantially minimized or, in some cases, completely eliminated. Jarosite is a relatively worthless by-product formed in many prior art processes. In contrast ferric ammonium sulphate is a component of conventional fertilizers and thus, this aspect of the present process is capable of recovering iron originally present in the feedstock as a saleable compound. It is believed that the use of a leach medium comprising sulphuric acid and ammonium nitrate is important in the production of ferric ammonium sulphate in preference to jarosite in the present process. In this regard, it is also believed that the relatively high concentrations of the sulphuric acid and ammonium nitrate used in the leach medium help prevent jarosite formation.

Further, if the feedstock originally contains precious metals such as silver and gold, such metals (or compounds thereof) will be contained in the first residue produced in Step (a) of the present process. After the first residue is recovered and isolated in Step (b), it may then be liquefied whereby sulphur contained therein will be vapourized leaving a second residue consisting essentially of cuprous salt and the silver and gold. The silver (usually present as silver sulphate) may be removed from the second residue with a strong base. A non-limiting example of such a base is ammonium hydroxide, preferably at a concentration of greater than about 4M. The gold may then removed from the second residue by extraction with a suitable strong acid. Non-limiting examples of such an acids include aqua-regia (a 3:1 mixture of hydrochloric acid and nitric acid) and mixtures comprising ammonium nitrate (concentration greater than about 1.5M), sulphuric acid (concentration greater than about 6M) and sodium chloride (concentration greater than about 2.0M). Thereafter, separate extraction solutions of silver and gold may sent to electrowinning cells for recovery of the particular metal according to conventional electrowinning techniques. Alternatively, the gold may be recovered by other conventional techniques such as mechanical jigging (i.e. density separation) or by amalgamation with mercury. After recovery of the silver and gold, the barren extraction solutions may be recycled for reuse. It will be appreciated recovery of silver and/or gold can be integrated into a system for recovery of iron as described hereinabove.

With reference to the drawing there is illustrated a schematic of the present process. It will be appreciated that the schematic is for illustrative purposes only and should not be used to limit the scope of the present invention.

The drawing illustrates a schematic for a process which is capable of treating feedstocks comprising copper and, optionally, a wide variety of other metals. A feedstock tank 1, a sulphuric acid tank 2 and an ammonium nitrate tank 3 are provided and are capable of metering predetermined amounts of their contents to a leaching tank 4 for reaction of the components. The reaction of the components is conducted at substantially atmospheric pressure and at a temperature in the range of from about 105° C. to about 130° C., preferably from about 110° C. to about 120° C., most preferably from about 112° C. to about 115° C., and results in the production of (i) a first residue comprising cuprous salt, sulphur, ferric salt (if iron is present in feedstock), silver (if present in feedstock) and gold (if present in feedstock) and (ii) a leachate comprising copper and zinc (if present in feedstock).

The first residue and leachate are fed to and separated in a solids/liquids separation zone 5. In a preferred aspect of the present process, zone 5 further includes an intercooler capable of cooling the leachate to a temperature of from about 50° to about 90° C., more preferably from about 55° to about 65° C. Typically, such temperatures favour precipitation of iron in this zone. As is well known in the art, it is preferred not to have iron present in the leachate going to the electrowinning cells.

The leachate (liquid) from zone 5 is fed to a zinc electrowinning zone 7 wherein zinc is electro-deposited in an electrowinning cell and removed from zone 7. The electrowon solution in zone 7 still contains copper and is thereafter fed to a copper electrowinning zone 6 wherein copper is electro-deposited in an electrowinning cell and removed from zone 6. The electrowon solution from zone 6 essentially comprises sulphuric acid and ammonium nitrate, which may recycled to leaching zone 4 or fed to a waste tank (not shown) via a valve 12. If the electrowon solution from zone 6 is recycled to zone 4, it is preferred to preheat the solution to a temperature of in the range of from about 105° C. to about 130° C., preferably from about 110° C. to about 120° C., most preferably from about 112° C. to about 115° C. prior to introduction into zone 4.

During the reaction of the components in leaching tank 4, nitrogen oxides ($NO_x$) are produced and are allowed to be introduced to the anode compartment of the electrowinning cells in zones 6 and 7. The primary purpose for sparging the $NO_x$ in this fashion is to reoxidize it to $NO_3$. Further, the nitrate ion may be recycled to the initial steps of the process.

The first residue produced in zone 4 contains sulphur (one third of which may be milk of sulphur), ferric ammonium sulphate, cuprous amine sulphate, cuprous sulphate, silver sulphate, native gold, and gangue, and may be "blown down" in solids/liquids separation zone 5 to a sulphur removal zone 8.

In sulphur removal zone 8, the first residue is heated to a temperature in range of from about 200° to about 250° C. to produce liquid sulphur having a relatively high vapour pressure. The sulphur vapour may be drawn off the first residue and condensed and collected (not shown) for future burning and/or sale. After the sulphur vapour is removed, the second residue results and is passed to ferric ammonium sulphate removal zone 9. In zone 9, the second residue is contacted with hot water (temperature of at least 60° C.) which results in extraction of the ferric ammonium sulphate from the second residue. The resulting solution may be separated from the remaining components of the second residue and boiling to remove water thereby yielding ferric ammonium sulphate.

The remaining components of the second residue are then passed to a cuprous salt removal zone 10 wherein they are contacted with acetonitrile to dissolve the cuprous sulphate and cuprous amine sulphate. The resulting solution is separated from the remaining components of the second residue and transferred to a vessel (not shown) wherein it is made to disproportionate by agitation resulting in the formation of metallic copper and soluble cupric salts (cupric sulphate and cupric amine sulphate). The metallic copper is removed and the remaining solution is vacuum evaporated to precipitate and separate the cupric salts from the acetonitrile. The cupric salts may then be added to copper electrowinning zone 6 or process to produce "blue stone" and sold as an agricultural chemical. The acetonitrile may be suitably recycled.

At this point the second residue comprises gangue, silver sulphate and native gold. The silver sulphate may be solubilized by contacting the second residue with concentrated ammonium hydroxide. The resulting solution is separated from the gangue and native gold and introduced into a silver electrowinning cell 11 wherein silver is electrowon. The remaining gangue and native gold may be contacted with aqua-regia to dissolve the gold. The resulting solution is separated from the gangue and introduced into a gold electrowinning cell 13 wherein gold is electrowon. The washed gangue may then be discarded.

Using the present process it has been found that, for a feedstock such as chalcopyrite, up to about one half of the copper contained therein may be recovered as cuprous salt without the use of electricity (i.e. electrowinning) owing to the relative insolubility of cuprous salt in the present process. This cuprous salt may then be efficiently processed to recover metallic copper and cupric salts (e.g. by disproportionation).

Although the present invention has been described hereinabove with reference to specific steps of the process thereof, it will be appreciated that various modifications and changes may be made therein without departing from the true spirit and scope of the invention, and thus, it is not intended to limit the invention by the specific steps described hereinabove.

What is claimed is:

1. A process for recovery of metal from a feedstock comprising copper and at least one metal selected from the group consisting essentially of iron, zinc, silver and gold, the process comprising the steps of:
    (a) contacting the feedstock with an aqueous mixture comprising ammonium nitrate having a concentration greater than about 1.5M and sulphuric acid having a concentration greater than about 6M at a temperature of from about 105° C. to about 130° C., to produce a first residue comprising a cuprous salt and a leachate comprising copper;
    (b) separating the residue from the leachate;
    (c) electrowinning copper from the leachate;
    (d) liquefying the first residue whereby sulphur is vaporized and a second residue results consisting essentially of the cuprous salt;
    (e) dissolving the cuprous salt in a suitable solvent;
    (f) disporportionating the cuprous salt to produce soluble cupric ion and metallic copper;
    (g) separating the soluble cupric ion from the metallic copper; and
    (h) recovering the soluble cupric ion as a cupric salt.

2. The process defined in claim 1, wherein said feedstock is selected from at least one of an ore, a concentrate or a combination thereof.

3. The process defined in claim 2, wherein Step (a) is conducted at a temperature of from about 112° to about 115° C.

4. The process defined in claim 2, wherein the ore concentrate is ground to a size of from about 275 mesh to about 325 mesh prior to contact with the aqueous mixture.

5. The process defined in claim 2, wherein the concentration of said sulphuric acid is in the range of from about 7 to about 10M and the concentration of said ammonium nitrate is in the range of from about 2.5 to about 4M.

6. The process defined in claim 2, wherein Step (c) is conducted at a temperature of from about 50° to about 70° C.

7. The process defined in claim 2, wherein said feedstock comprises copper and iron, and said first residue in Step (a) comprises cuprous ion and ferric ion.

8. The process defined in claim 1, wherein said ore is selected from the group consisting essentially of sulphide ore and arsenide ore.

9. The process defined in claim 3, wherein said arsenide ore is at least one member selected from the group consisting essentially of iron diarsenide and cobalt diarsenide.

10. The process defined in claim 3, wherein said sulphide ore comprises at least one member selected from the group consisting essentially of chalcopyrite, chalcocite, bornite, molybdate, pyrite, arsenopyrite, sphalerite and tetrahedrite.

11. The process defined in claim 1, wherein Step (a) is conducted at a temperature of from about 110° to about 120° C.

12. The process defined in claim 1, wherein the ore concentrate is ground to a size of from about 250 mesh to about 350 mesh prior to contact with the aqueous mixture.

13. The process defined in claim 1, wherein said solvent is an organic amine.

14. The process defined in claim 1, wherein said solvent is selected from the group consisting essentially of acetonitrile, 2-hydroxycyanoethane, acrylonitrile and propionitrile.

15. The process defined in claim 1, wherein said solvent is acetonitrile.

16. The process defined in claim 1, wherein Step (h) comprises vacuum distillation of said soluble cupric ion to produce cupric salt.

17. The process defined in claim 16, wherein said cupric salt produced in Step (h) is mixed with leachate from Step (b) prior to electrowinning copper from said leachate.

18. A process for recovery of metal from a feedstock comprising copper and iron, the process comprising the steps of:
    (a) contacting the feedstock with an aqueous mixture comprising ammonium nitrate having a concentration greater than about 1.5M and sulphuric acid having a concentration greater than about 6M at a temperature of from about 105° C. to about 130° C., to produce a first residue comprising a cuprous salt and a ferric salt, and a leachate comprising copper;

(b) separating the residue from the leachate;
(c) electrowinning copper from the leachate;
(d) liquefying the first residue whereby sulphur is vaporized and a second residue results consisting essentially of the cuprous salt and the ferric salt;
(e) extracting said ferric salt with a suitable solvent;
(f) dissolving the cuprous salt in a suitable solvent;
(g) disporportionating the cuprous salt to produce soluble cupric ion and metallic copper;
(h) separating the soluble cupric ion from the metallic copper; and
(i) recovering the soluble cupric ion as a cupric salt.

19. The process defined in claim 18, wherein said cuprous salt is dissolved in acetonitrile in Step (f).

20. The process defined in claim 19, wherein Step (i) comprises vacuum distillation of said soluble cupric ion to produce cupric sulphate.

21. The process defined in claim 20, wherein said cupric sulphate is mixed with leachate from Step (b) prior to electrowinning copper from said leachate.

22. The process defined in claim 18, wherein said ferric salt is extracted with water having a temperature of at least about 60° C.

* * * * *

UNITED STATES PATENT AND TRADEMARK OFFICE
CERTIFICATE OF CORRECTION

PATENT NO. : 5,188,713

DATED : February 23, 1993

INVENTOR(S) : Robert N. O'Brien and Thomas D. McEwan

It is certified that error appears in the above-identified patent and that said Letters Patent is hereby corrected as shown below: Title page:

Item (73):
Assignee: change "Envirochip Technologies Ltd." to --Environchip Technologies Ltd.--

Signed and Sealed this

Fifth Day of April, 1994

Attest:

BRUCE LEHMAN

Attesting Officer        Commissioner of Patents and Trademarks